United States Patent
Lai et al.

(10) Patent No.: US 12,159,624 B2
(45) Date of Patent: Dec. 3, 2024

(54) METHOD OF FORMING AUGMENTED CORPUS RELATED TO ARTICULATION DISORDER, CORPUS AUGMENTING SYSTEM, SPEECH RECOGNITION PLATFORM, AND ASSISTING DEVICE

(71) Applicants: APrevent Medical Inc., Taipei (TW); National Yang Ming Chiao Tung University, Taipei (TW); Guan-Min Ho, Milpitas, CA (US)

(72) Inventors: Ying-Hui Lai, Taipei (TW); Guan-Min Ho, Milpitas, CA (US); Chia-Yuan Chang, Taipei (TW)

(73) Assignees: APREVENT MEDICAL INC., Taipei (TW); Guan-Min Ho, Milpitas, CA (US); NATIONAL YANG MING CHIAO TUNG UNIVERSITY, Taipei (TW)

( * ) Notice: Subject to any disclaimer, the term of this patent is extended or adjusted under 35 U.S.C. 154(b) by 274 days.

(21) Appl. No.: 17/921,948

(22) PCT Filed: Oct. 26, 2021

(86) PCT No.: PCT/US2021/056683
§ 371 (c)(1),
(2) Date: Oct. 27, 2022

(87) PCT Pub. No.: WO2022/250724
PCT Pub. Date: Dec. 1, 2022

(65) Prior Publication Data
US 2023/0146945 A1    May 11, 2023

(30) Foreign Application Priority Data

May 28, 2021 (TW) ................................. 110119536

(51) Int. Cl.
*G10L 15/00* (2013.01)
*G10L 13/00* (2006.01)
(Continued)

(52) U.S. Cl.
CPC ............ *G10L 15/07* (2013.01); *G10L 13/047* (2013.01); *G10L 15/02* (2013.01); *G10L 15/063* (2013.01);
(Continued)

(58) Field of Classification Search
None
See application file for complete search history.

(56) References Cited

U.S. PATENT DOCUMENTS

2015/0310198 A1 * 10/2015 Gross .................... G10L 15/063 726/19
2018/0020285 A1 * 1/2018 Zass ..................... G10L 21/0224
(Continued)

FOREIGN PATENT DOCUMENTS

CN          112193959 A   *  1/2021
TW          202036535 A   * 10/2020 ........... G10L 15/063
WO    WO-2015019835 A1   *  2/2015 ............... A61F 2/20

*Primary Examiner* — Shreyans A Patel
(74) *Attorney, Agent, or Firm* — HSML P.C.

(57) ABSTRACT

A method of forming augmented corpus related to articulation disorder includes acquiring target speech feature data from a target corpus; acquiring training speech feature data from training corpora; training a conversion model to make it capable of converting training speech feature data into a respective output that is similar to the target speech feature data; receiving an augmenting source corpus and acquiring augmenting source speech feature data therefrom; converting, by the conversion model thus trained, the augmenting source speech feature data into converted speech feature data; and synthesizing the augmented corpus based on the converted speech feature data.

15 Claims, 6 Drawing Sheets

(51) Int. Cl.
*G10L 13/047* (2013.01)
*G10L 15/02* (2006.01)
*G10L 15/06* (2013.01)
*G10L 15/07* (2013.01)
*G10L 15/22* (2006.01)
*G10L 15/30* (2013.01)
*G10L 25/18* (2013.01)

(52) U.S. Cl.
CPC .............. *G10L 15/22* (2013.01); *G10L 15/30* (2013.01); *G10L 25/18* (2013.01)

(56) References Cited

U.S. PATENT DOCUMENTS

| | | | |
|---|---|---|---|
| 2020/0312302 A1* | 10/2020 | Lin | G10L 15/063 |
| 2022/0068257 A1* | 3/2022 | Biadsy | G10L 13/08 |
| 2023/0146945 A1* | 5/2023 | Lai | G10L 13/00 |
| | | | 704/243 |

* cited by examiner

METHOD OF FORMING AUGMENTED CORPUS RELATED TO ARTICULATION DISORDER, CORPUS AUGMENTING SYSTEM, SPEECH RECOGNITION PLATFORM, AND ASSISTING DEVICE

CROSS-REFERENCE TO RELATED APPLICATION

This application claims priority of Taiwanese Invention Patent Application No. 110119536, filed on May 28, 2021.

FIELD

The disclosure relates to a system and a method of forming training data, and more particularly to a system and a method of forming an augmented corpus for training a speech recognition model.

BACKGROUND

Articulation disorder is a common speech disability (as used herein, the term "articulation disorder" is used as a collective term that encompasses any type of speech or articulation disorder that affects the proper pronunciation of a language). It may be caused by physical problems, such as defects of articulation organs, impairments of hearing or brain damage, etc. People with articulation disorder may pronounce unclearly for failing to use the correct portions of the articulation organs during pronunciation, for improperly controlling out-going air in terms of direction or traveling speed, or for having trouble with coordinated movement of the articulation organs.

It is possible to improve pronunciation abilities of people with articulation disorder through treatment. As technologies of artificial intelligence (AI) develop, there are several researches that use AI, such as neural network-based voice conversion (VC) or automatic speech recognition (ASR), to help people with articulation disorder to communicate better. For example, "Improving Dysarthric Speech Intelligibility Using Cycle-consistent Adversarial Training, arXiv preprint arXiv: 2001.04260, 2020" disclosed a cycle-consistent GAN (Generative Adversarial Network) model to convert speech of persons with articulation disorder to normal speech.

It is noted that, regardless of which technology is utilized, huge corpora of speech from people with articulation disorder are needed to improve the accuracy of the model in VC or ASR. However, in reality, it is quite difficult and time-consuming to record speech from people with articulation disorder in order to acquire the required corpora. When reading aloud, a speaker with articulation disorder is prone to mispronunciation, wrong sentence segmentation or weak pronunciation. Reading aloud for a long time also imposes a great physical and emotional burden on the speaker.

SUMMARY

Therefore, an object of the disclosure is to provide a method of forming augmented corpus related to articulation disorder that can alleviate at least one of the drawbacks of the prior art.

According to one embodiment of the disclosure, the method includes:
receiving a target corpus recorded from a user with articulation disorder;
receiving a plurality of training corpora that are related to normal speech;
acquiring a set of target speech feature data from the target corpus;
acquiring a plurality of sets of training speech feature data respectively from the training corpora;
feeding the set of target speech feature data and the sets of training speech feature data into a conversion model for training the conversion model, so as to make the conversion model thus trained capable of converting each of the sets of training speech feature data into a respective set of output data that is similar to the set of target speech feature data;
receiving an augmenting source corpus that is related to normal speech;
acquiring a set of augmenting source speech feature data from the augmenting source corpus;
inputting the set of augmenting source speech feature data into the conversion model thus trained;
converting, by the conversion model thus trained, the set of augmenting source speech feature data into a set of converted speech feature data; and
synthesizing the augmented corpus based on the set of converted speech feature data.

Another object of the disclosure is to provide a corpus augmenting system that can alleviate at least one of the drawbacks of the prior art.

According to one embodiment of the disclosure, the corpus augmenting system includes a feature acquiring module, a conversion model, and a waveform reconstruction module.

The feature acquiring module is configured to
receive a target corpus Soak recorded from a user with articulation disorder and acquire a set of target speech feature data therefrom,
receive a plurality of training corpora that are related to normal speech, and acquire a plurality of sets of training speech feature data respectively from the training corpora,
receive an augmenting source corpus that is related to normal speech and acquire a set of augmenting source speech feature data from the augmenting source corpus,
feed the set of target speech feature data and the sets of training speech feature data into the conversion model for training the conversion model, so as to make the conversion model thus trained capable of converting each of the sets of training speech feature data into a respective set of output data that is similar to the set of target speech feature data, and
input the set of augmenting source speech feature data into the conversion model thus trained, wherein the conversion model thus trained is configured to convert the set of augmenting source speech feature data into a set of converted speech feature data.

The waveform reconstruction module is configured to synthesize the augmented corpus based on the set of converted speech feature data.

Another object of the disclosure is to provide a speech recognition platform that utilizes the augmented corpus to train a user-specific speech recognition model, so as to make the user-specific speech recognition model thus trained capable of recognizing speech of a user with articulation disorder.

According to one embodiment of the disclosure, the speech recognition platform includes the corpus augmenting system as mentioned before, a user corpus database, an augmented corpus database, and an automatic speech recognition (ASR) system.

The user corpus database stores the target corpus recorded from the user with articulation disorder. The augmented corpus database stores the augmented corpus formed by the corpus augmenting system. The ASR system has a deep learning model, and is configured to receive the target corpus and the augmented corpus respectively from the user corpus database and the augmented corpus database, and to train the deep learning model with the target corpus and the augmented corpus. The deep learning model thus trained serves as the user-specific speech recognition model Another object of the disclosure is to provide an assisting device that can help a user with articulation disorder to better communicate with others.

According to one embodiment of the disclosure, the assisting device includes a speech input unit configured to receive a user speech input, a processing unit connected to the speech input unit, and an output unit connected to the processing unit.

The processing unit is configured to receive the user speech input from the speech input unit and to send the user speech input to the user-specific speech recognition model for speech recognition. The user-specific speech recognition model is trained with a target corpus recorded from a user with articulation disorder and the augmented corpus that is formed by the method of forming an augmented corpus related to articulation disorder as mentioned before, and is configured to recognize the user speech input and return a recognition result.

The output unit is configured to receive and output the recognition result.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
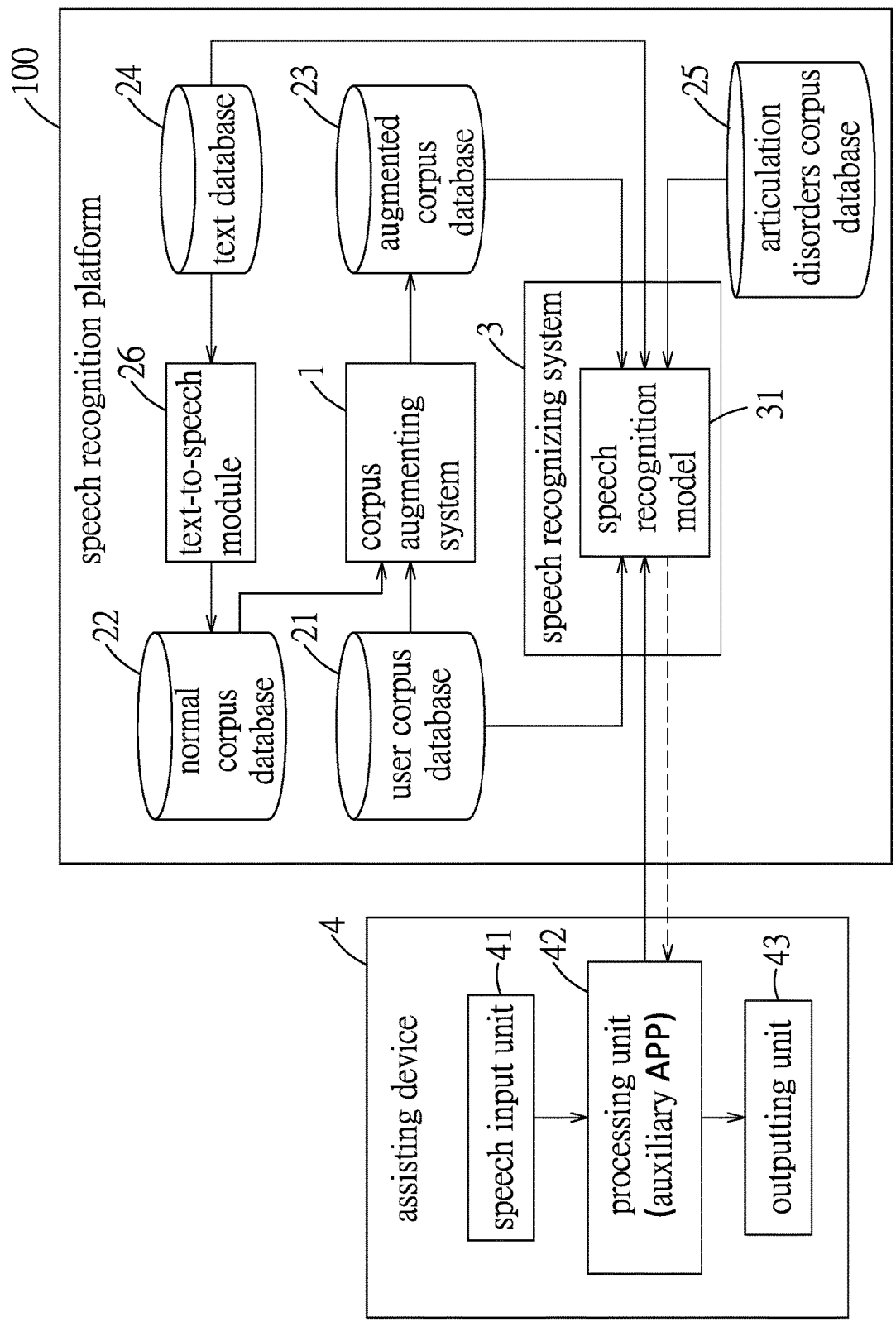
FIG. 1 is a block diagram illustrating a speech recognition platform according to an embodiment of the disclosure.

Before the disclosure is described in greater detail, it should be noted that where considered appropriate, reference numerals or terminal portions of reference numerals have been repeated among the Figures to indicate corresponding or analogous elements, which may optionally have similar characteristics.

Throughout the disclosure, the term "connect" may refer to a connection between two or more electronic equipments, devices or components via an electrically conductive material (which may be referred to as a direct electric connection), a connection between two or more electronic equipments, devices or components via another one or more electronic equipments, devices or components (which may be referred to as an indirect electric connection), or a connection between two or more electronic equipments, devices or components using wireless technology.

Figure 2:
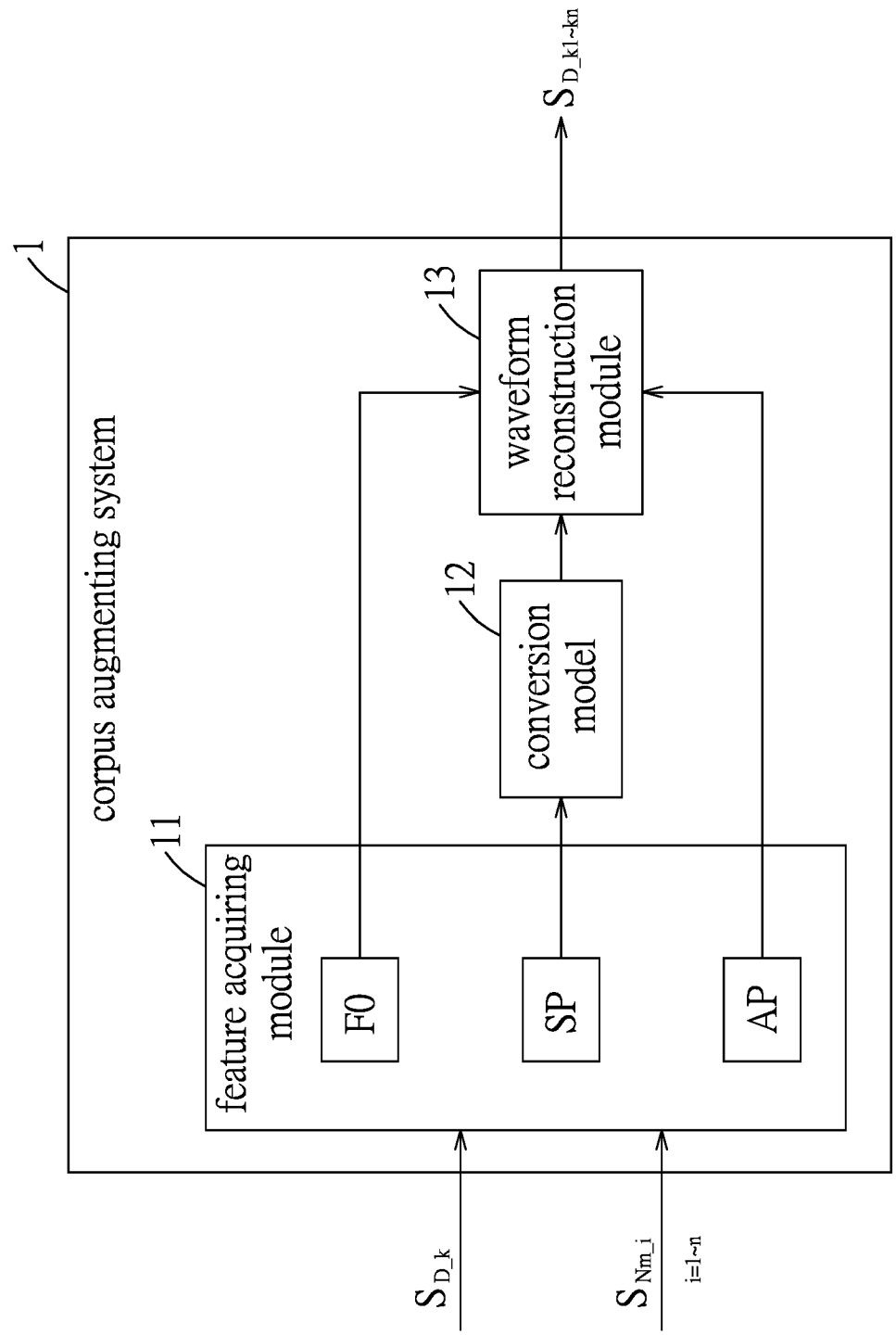
FIG. 2 is a block diagram illustrating a corpus augmenting system according to an embodiment of the disclosure.

Referring to FIGS. 1 and 2, an embodiment of a corpus augmenting system 1 is used to generate augmented corpora for persons with articulation disorder. The corpus augmenting system 1 is applied to a speech recognition platform 100. The speech recognition platform 100 may be a cloud server or a local server, can be implemented by a single device or utilize distributed computing, and provides speech recognition services to persons with articulation disorder.

First of all, an example of generating a user-specific augmented corpus for one person with articulation disorder (hereinafter referred to as "user") is provided in this embodiment, but the augmented corpus generated according to this disclosure may also be commonly used by people with articulation disorder. Specifically, in a case that a group of people with articulation disorder have commonalities in terms of pronunciation, the augmented corpus generated by a method of the present disclosure can be used as public corpus for this group of people.

In this embodiment, besides the corpus augmenting system 1, the speech recognition platform 100 further includes a plurality of databases 21-25 and a speech recognizing system 3 (which is an automatic speech recognition (ASR) system). The plurality of databases 21-25 include a user corpus database 21, a normal corpus database 22, an augmented corpus database 23, a text database 24 and an articulation disorder corpus database 25.

In this embodiment, the user corpus database 21 is built by the speech recognition platform 100 for the user, and stores a collection of the user's utterances that collectively serve as a target corpus. As used herein, examples of utterances include a spoken word, spoken words, a spoken phrase, a spoken sentence, etc. In practice, the user corpus database 21 may store a plurality of target corpora related respectively to different persons with articulation disorder. A target corpus may have quite a small amount of data. For example, there may only be dozens of recorded utterances of the user stored in the user corpus database 21 as the target corpus. On the other hand, the normal corpus database 22 stores a large collection of normal utterances (hereinafter referred to as normal corpora). For example, the normal corpus database 22 may store more than ten thousand normal utterances generated by normal speakers or computers. Some of the normal utterances serve to form training corpora (elaborated below) and some serve to form augmenting source corpora (elaborated below). Some of the training corpora may be duplicative of some of the augmenting source corpora; that is, for example, some of the normal utterances serve as part of the training corpora and also part of the augmenting source corpora. The text database 24 stores a plurality of pieces of text.

In addition, the speech recognition platform 100 is further provided with a text-to-speech module 26 that can read the pieces of text in the text database 24 and generate speech files to serve as part of the normal corpora. The text-to-speech module 26 is a computer reading program, such as Google's Text-to-Speech (TTS) system. More specifically, the text-to-speech module 26 may use Tacotron 2 or WaveGlow module, which can convert text into audio formats such as WAV, MP3, etc. The normal corpus database 22 receives and stores the speech files from the text-to-speech module 26. That is to say, the augmenting source corpus and the training corpora are obtained by at least one of recording speech of one or more human beings, or storing audio output of the text-to-speech module 26.

It should be noted that, throughout the disclosure, a system, device, module, or model may be realized by hardware and/or firmware such as field-programmable gate array (FPGA), system-on-chip, and micro-processor, and may be implemented by a single component or multiple components. Certainly, the system, device, module, or model may also be implemented by software. For example, when a processor reads and executes program instructions stored in a computer-readable medium, the processor may implement a method of forming an augmented corpus related to articulation disorder as shown in FIGS. 3 and 4, and embody a software module as shown in FIG. 2, which serves as the corpus augmenting system 1.

Figure 3:
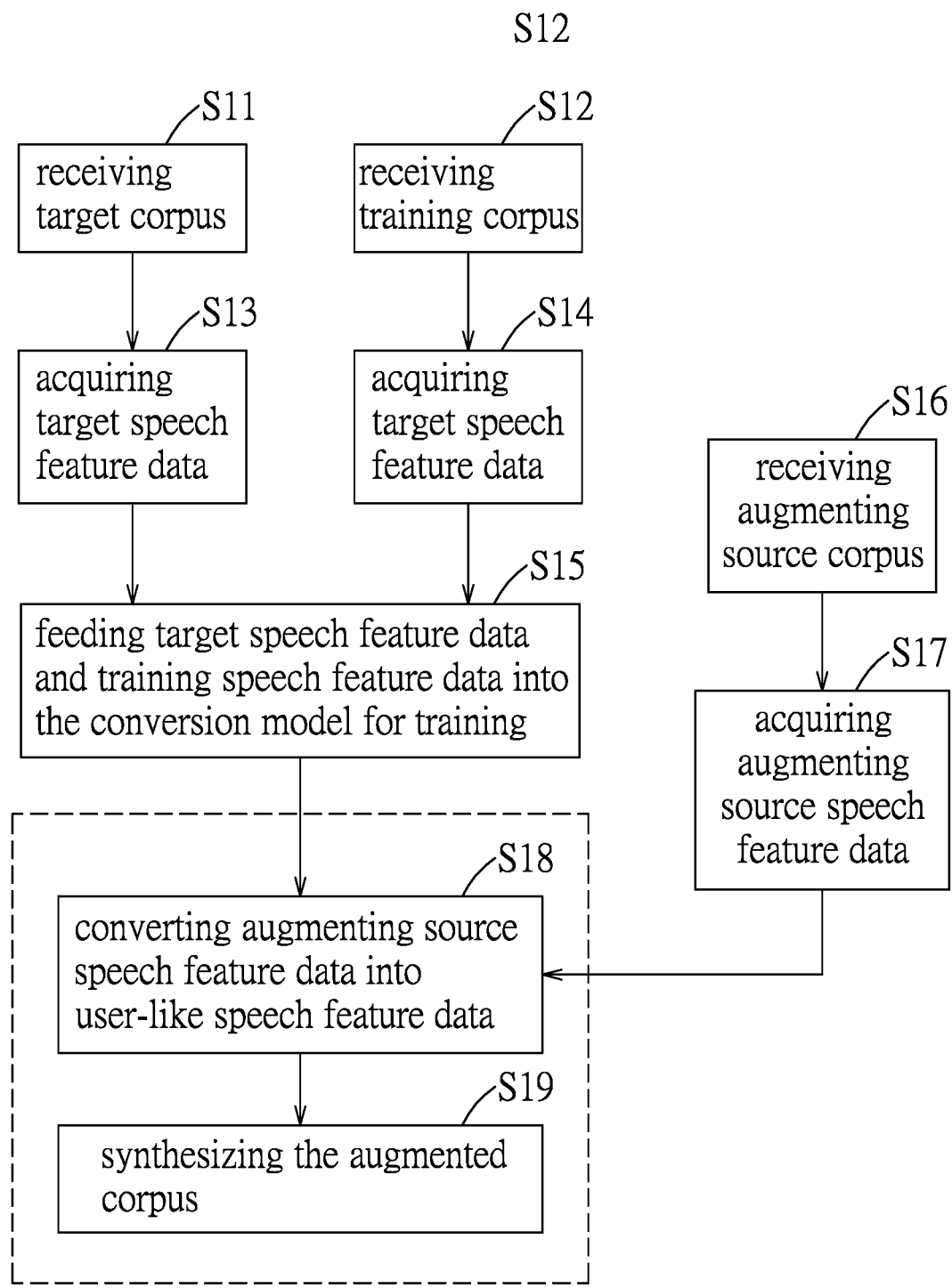
FIG. 3 is a flow chart illustrating an embodiment of a method of forming an augmented corpus related to articulation disorder.
Figure 4:
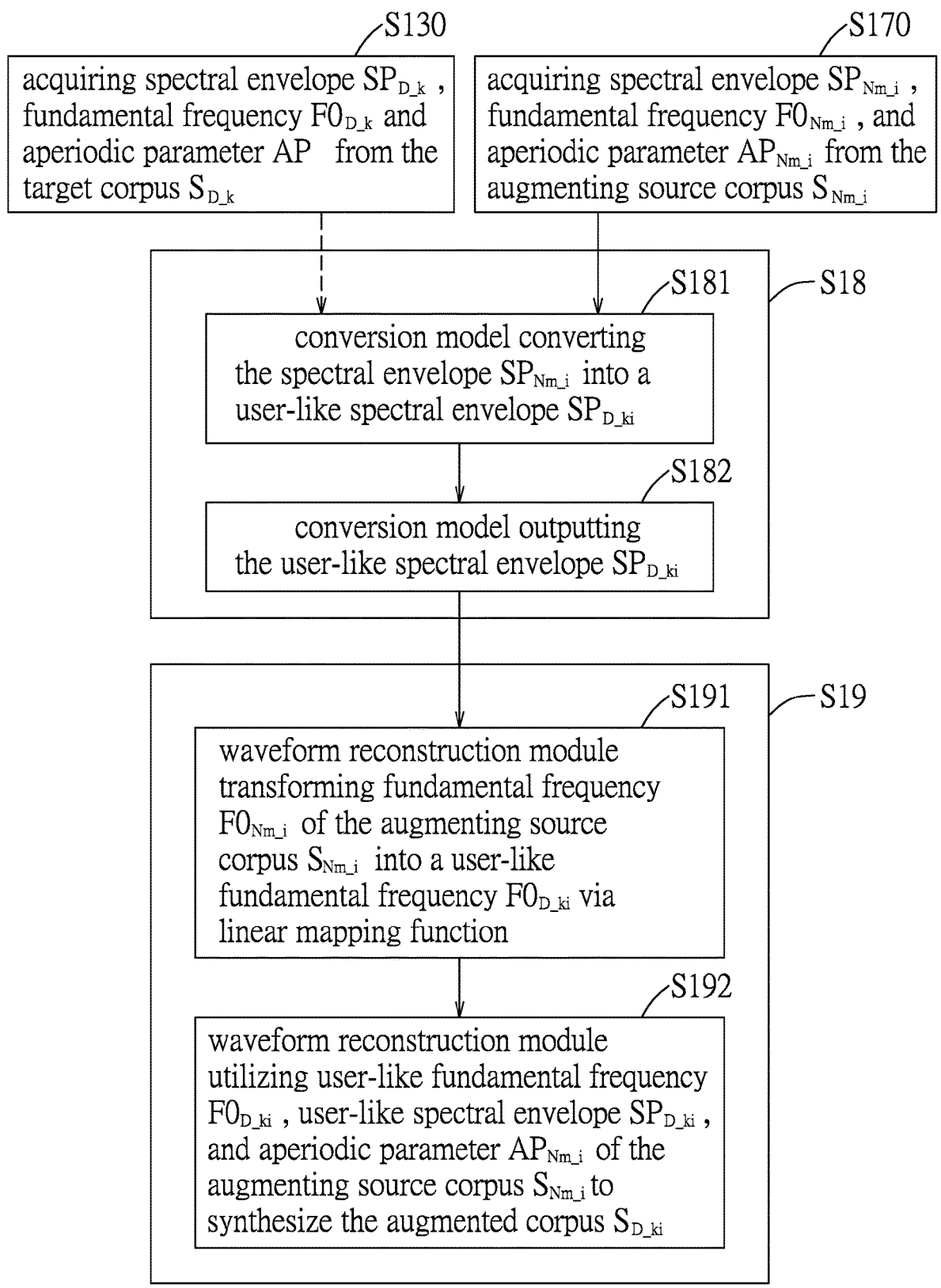
FIG. 4 is a flow chart illustrating exemplary implementation of some steps of the method in FIG. 3.

Further referring to FIG. 3, the method of forming an augmented corpus related to articulation disorder according to an embodiment of the present disclosure is mainly implemented by the corpus augmenting system 1 of the speech recognition platform 100. In this embodiment, the corpus augmenting system 1 includes a feature acquiring module 11, a conversion model 12 and a waveform reconstruction module 13 (see FIG. 2). The method of forming an augmented corpus related to articulation disorder may be used to generate a user-specific augmented corpus for the user, and includes the following steps.

In step S11, the feature acquiring module 11 of the corpus augmenting system 1 receives the target corpus from the user corpus database 21. The target corpus is, as mentioned above, a collection of utterances obtained by recording the speech of a specific user (hereinafter referred to as "user_k"), and is code-named "$S_{D\_k}$". There may be a plurality of speech files stored in the target corpus. In reality, the corpus augmenting system may generate a plurality of augmented corpora respectively for a plurality of persons with articulation disorder (e.g., user 1, user 2, and user m). For illustrative purposes, "user k" who is included in the plurality of persons (user 1 to user m) is taken as the only example, but the overall concept of this disclosure can be inferred based on this.

In step S12, the feature acquiring module 11 receives from the normal corpus database 22 the training corpora that are related to the normal utterances. Each of the normal utterances may be obtained from one of a plurality of normal speech sources (hereinafter referred to as "normal speech source i", where i is a variable that takes on a positive integer value ranging from 1 to n, and the plurality of normal speech sources are normal speech source 1, normal speech source 2, and normal speech source n). Each of the normal speech sources i described herein may be a normal speaker (human being) or a computer reading program. Each of the normal speech sources can further be defined as a human being or a computer reading program speaking at a specific time and in a specific environment. That is to say, a human being speaking in the morning at a park can serve as a normal speech source, while the same human being speaking inside a room can serve as another normal speech source. The number of normal speech sources (i.e., the value of n) is preferably tens of thousands.

The utterances in the target corpus $S_{D\_k}$ and the utterances in the training corpora may correspond to the same piece of text in the text database 24, so that the following training of models may achieve better results; however, this disclosure is not limited to such. Furthermore, for better customization and training effect, the utterances in the target corpus $S_{D\_k}$ and the utterances in the training corpora may further stem from text that contain vocabularies commonly used by the user k.

It is noted that the corpus augmenting system 1 executes step S13 after step S11, and executes step S14 after step S12, but step S11 and step S12 are not limited to be executed sequentially.

In step S13, the feature acquiring module 11 acquires a set of target speech feature data from the target corpus $S_{D\_k}$. The set of target speech feature data may include at least one type of frequency domain parameter, the following being non-exclusive examples: a spectral envelope ($SP_{D\_k}$), a set of Mel-frequency cepstral coefficients (MFCC), a raw waveform feature of time domain, a phonetic posteriorgram (PPG), an i-Vector, an x-Vector.

In step S14, the feature acquiring module 11 acquires a set of training speech feature data from each of the training corpora. The sets of training speech feature data acquired respectively from the training corpora each include the same type of frequency domain parameter acquired in step S13, e.g., a spectral envelope (SP), as the set of target speech feature data.

In step S15, the feature acquiring module 11 feeds the set of target speech feature data and the sets of training speech feature data into the conversion model 12 for training the conversion model 12, so as to make the conversion model 12 thus trained capable of converting each of the sets of training speech feature data into a respective set of output data that is similar to the set of target speech feature data. For example, in the case that the set of target speech feature data and the sets of training speech feature data each include a spectral envelope, the conversion model 12 thus trained is capable of converting the spectral envelope of each of the sets of training speech feature data into a respective set of output data similar to the spectral envelope $SP_{D\_k}$ of the target corpus $S_{D\_k}$.

In step S16, the feature acquiring module 11 receives from the normal corpus database 22 an augmenting source corpus that is related to normal speech (hereinafter code-named $S_{Nm\_i}$, wherein "i" is related to the "normal speech source_i" that generated the normal utterances included in the augmenting source corpus).

In step S17, the feature acquiring module 11 acquires a set of augmenting source speech feature data from the augmenting source corpus $S_{Nm\_i}$. The set of augmenting source speech feature data includes the same type of frequency domain parameter as that acquired in steps S13 and S14, e.g., a spectral envelope (code-named $SP_{Nm\_i}$).

In step S18, the conversion model 12 thus trained receives the set of augmenting source speech feature data, and converts the set of augmenting source speech feature data into a set of converted speech feature data. The converted speech feature data is also called a user-like speech feature data, and hereinafter code-named $SP_{D\_ki}$ in the case that the type of frequency domain parameter included in the sets of speech feature data is spectral envelope.

In step S19, the waveform reconstruction module 13 synthesizes the augmented corpus (hereinafter code-named $S_{D\_ki}$) that is specific to the user_k and that is derived from the augmenting source corpus $S_{Nm\_i}$ based on the set of user-like speech feature data.

The following is a concrete disclosure of some steps of the method of forming an augmented corpus related to articulation disorder, for more clearly illustrating one specific embodiment of the present disclosure.

Referring to FIGS. 3 and 4, step S13 may be specifically implemented in the way of step S130. In step S130, the feature acquiring module 11 acquires, from the target corpus $S_{D\_k}$, multiple frequency domain parameters including the spectral envelope $SP_{D\_k}$ and a fundamental frequency $F0_{D\_k}$. The feature acquiring module 11 further acquires an aperiodic parameter $AP_{D\_k}$ from the target corpus $S_{D\_k}$. In this case, the spectral envelopes of the training corpora are acquired in step S14, and it is the spectral envelope $SP_{D\_k}$ and the spectral envelopes of the training corpora that are fed into the conversion model 12 for training. The conversion model 12 is thus trained to convert the spectral envelope of each of the training corpora into a result that is similar to the spectral envelope $SP_{D\_k}$ of the target corpus in step S15. The detailed technique of acquiring the frequency domain parameters can include, for example, using a WORLD vocoder or using Vocoders (e.g., such as STRAIGHT, Wave-NET, WaveRNN, WaveGlow, etc.) to acquire speech features. For details of WORLD vocoder, please refer to Masanori Morise, Fumiya Yokomori, and Kenji Ozawa, "WORLD: a vocoder-based high-quality speech synthesis system for real-time applications", IEICE TRANSACTIONS on Information and Systems, Vol. E99-D, No. 7, pp.1877-1884, July 2016.

As for step S17, it may be specifically implemented in the way of step S170. In step S170, the feature acquiring module 11 acquires, from the augmenting source corpus $S_{Nm\_i}$, frequency domain parameters that include a spectral envelope $SP_{Nm\_i}$ and a fundamental frequency $F0_{Nm\_i}$. The feature acquiring module 11 further acquires an aperiodic parameter $AP_{Nm\_i}$ from the augmenting source corpus $S_{Nm\_i}$.

In the case that the spectral envelope $SP_{Nm\_i}$ is acquired from the augmenting source corpus $S_{Nm\_i}$, step S18 specifically includes step S181 and step S182. In step 181, the corpus conversion model 12 thus trained receives the spectral envelope $SP_{Nm\_i}$ of the augmenting source corpus $S_{Nm\_i}$ and converts the spectral envelope $SP_{Nm\_i}$ into a converted spectral envelope (also called user-like spectral envelope) $SP_{D\_ki}$ that serves as part of the set of the user-like speech feature data. In step S182, the corpus conversion model 12 outputs the user-like spectral envelope $SP_{D\_ki}$. StarGAN architecture can be used for the conversion, and for details of the StarGAN architecture, reference may be made to Hirokazu Kameoka, et al., "Stargan-vc: non-parallel many-to-many voice conversion using star generative adversarial networks", arXiv:1806.02169, June, 2018. Alternatively, the Crank architecture as detailed in Kazuhiro Kobayashi, et al., "CRANK: An open-source software for Nonparallel Voice Conversion Based on Vector-Quantized Variational Autoencoder", arXiv:2103.02858, March, 2021, can be used.

Finally, in the process of waveform reconstruction, step S19 is specifically implemented in step S191 and step S192. In step S191, the waveform reconstruction module 13 first transforms, through a preset linear mapping function, the fundamental frequency $F0_{Nm\_i}$ of the augmenting source corpus $S_{Nm\_i}$ into a transformed fundamental frequency (also called user-like fundamental frequency) $F0_{D\_ki}$ that is similar to the fundamental frequency $F0_{D\_k}$ of the target corpus $S_{D\_k}$. Then, in step S192, the waveform reconstruction module 13 utilizes the user-like fundamental frequency $F0_{D\_ki}$, the user-like spectral envelope $SP_{D\_ki}$, and the aperiodic parameter $AP_{Nm\_i}$ of the augmenting source corpus $S_{Nm\_i}$ to synthesize the augmented corpus $S_{D\_ki}$. In this way, the augmented corpus $S_{D\_ki}$ corresponds to the augmenting source corpus $S_{Nm\_i}$ while simulates the features of the target corpus $S_{D\_k}$, such as the spectral envelope $SP_{D\_k}$ and the fundamental frequency $F0_{D\_k}$. For detailed speech synthesis technology, for example, an improved speech synthesis method based on WaveNet's WaveRNN architecture can be used to quickly generate speech (reference may be made to Nal Kalchbrenner, et al., "Efficient Neural Audio Synthesis", arXiv 2018), or an NVIDIA's speech synthesizer can be applied (reference may be made to Ryan Prenger, et al., "Waveglow: A flow-based generative network for speech synthesis", arXiv:1811.00002, October, 2018).

Referring back to FIG. 1, the augmented corpus $S_{D\_ki}$ that has been generated by the corpus augmenting system 1 is stored in the augmented corpus database 23. Assuming that the augmenting source corpora include 10,000 corpora (each corpus is a collection of utterances), the number of augmented corpora generated by the corpus augmenting system 1 would also be 10,000. It can be seen that utilizing the corpus augmenting system 1 of the present disclosure can efficiently provide a huge number of augmented corpora that simulate the target corpus. Thus, the accuracy of a speech recognition model in the speech recognizing system 3 may be improved.

Figure 5:
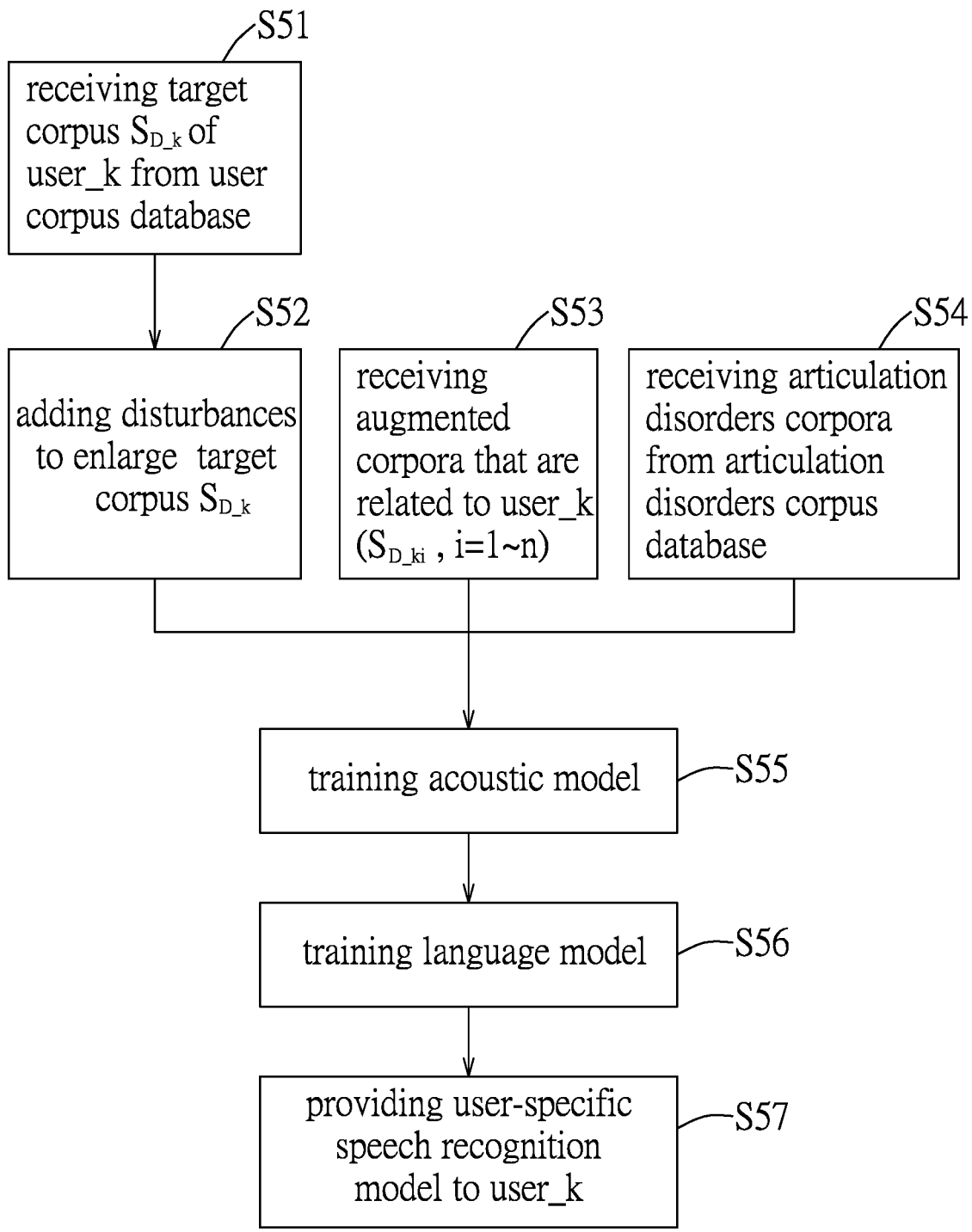
FIG. 5 is a flow chart illustrating steps of forming a user-specific speech recognition model.

Referring to FIGS. 1 and 5, in this embodiment, the speech recognizing system 3 of the speech recognition platform 100 executes the following steps to establish a speech recognition model 31. The speech recognition model 31 of the speech recognizing system 3 is a deep learning model that has been trained using training data sets (elaborated below), and may be embodied by at least one processor with a computer-readable medium having program instructions stored therein. The processor reads and executes the program instructions to perform the method, as described in FIG. 5, for establishing the speech recognition model 31 that is dedicated to the user_k. It is noted that the present disclosure is not limited to establishing a user-specific speech recognition model 31; it is also feasible to establish a commonly-used speech recognition model 31 for multiple different users.

In step S51, the speech recognition model 31 receives the target corpus $S_{D\_k}$ of the user_k from the user corpus database 21.

In step S52, the speech recognition model 31 performs disturbances, enhancements, and time axis stretching, etc., on each of the utterances in the target corpus $S_{D\_k}$, and the resultant utterances are saved as other utterances to enlarge the target corpus $S_{D\_k}$.

In step S53, the speech recognition model 31 receives, from the augmented corpus database 23, all the augmented corpora that are related to the user_k (i.e., $S_{D\_k1}$ to $S_{D\_kn}$).

In step S54, the speech recognition model 31 further receives articulation disorder corpora from the articulation disorder corpus database 25. In this embodiment, utterances generated by a plurality of persons with articulation disorder are collected and serve to form the articulation disorder corpora. The utterances of the plurality of persons with articulation disorder are obtained by recording daily conversation or speech of the persons or recording the persons reading text content out loud, and may facilitate the recognition effect of the speech recognition model 31. The target corpus $S_{D\_k}$, the augmented corpora and the articulation disorder corpora are the training data sets that are used to train the deep learning model.

In step S55, the speech recognition model 31 trains an acoustic model (which is a part of the deep learning model). First, each of the received corpora is disassembled to smallest units, which are phonemes. Then, Mel-Frequency Cepstral Coefficients (MFCC) are extracted from the received corpus, and grouped with phonemes by means of Gaussian Mixture Model (GMM). Monophones, diphones and triphones are obtained through Hidden Markov Model (HMM), and serve as the training data for training the acoustic model. In this embodiment, a Time Delay Neural Network (TDNN) architecture is used to train the acoustic model. In this architecture, an input layer has a number N of nodes which are used to receive a number N of MFCCs (for example, N=22), and each hidden layer has a number M of nodes (for example, M=40), so there are N×M weight values within the input layer and the hidden layers. This architecture may be applied with 13 hidden layers, and the time-stride between two hidden layers is 14 frames (the concept is similar to Convolutional Neural Network (CNN)). The weight values may be shared in the next hidden layer, so as to make the total size of this architecture 3×N×M. Finally, in the output layer, a phoneme classification is outputted.

In step S56, the speech recognition model 31 trains a language model (which is another part of the deep learning model). In this embodiment, a model of Kaldi Automatic Speech Recognition (ASR) N-gram is used as the language model to calculate the probability of words and to determine the most likely combination of characters. For details of the method of training acoustic model and language model, please refer to "Accurate and Compact Large Vocabulary Speech Recognition on Mobile Devices".

It is worth mentioning that in this embodiment, in steps S51 and S53, the target corpus $S_{D\_k}$ in the user corpus database 21 and the augmented corpora $S_{D\_ki}$ in the augmented corpus database 23 are received to train the speech recognition model 31. In the case that the target corpus $S_{D\_k}$ and one of the augmenting source corpora contain utterances obtained by someone reading text aloud, the speech recognizing system 3 also receives the relevant piece of text from the text database 24. That is to say, the piece of text also serves as training data for training the speech recognition model 31, and the speech recognition model 31 is trained by supervised learning. In another embodiment, unsupervised learning may be adopted on an existing speech recognizing system, and the training effect can be enhanced by inputting the aforementioned target corpus $S_{D\_k}$ and the augmented corpora $S_{D\_ki}$.

In step S57, when the acoustic model and the language model are well trained, the user-specific speech recognition model 31 has been trained and can be provided to the user_k. The user_k may use this trained user-specific speech recognition model 31 via an assisting device 4.

Referring back to FIG. 1, in this embodiment, the assisting device 4 can be a smart phone, a smart watch, a tablet computer or a notebook computer, etc., which can be connected to the speech recognition platform 100 over the Internet. The assisting device 4 includes a speech input unit 41 such as a microphone, an output unit 43 such as a speaker and/or a display screen, and a processing unit 42 such as a CPU (central processing unit) with one or more cores. The processing unit 42 is electrically connected to the speech input unit 41 and the output unit 43. The processing unit 42 is installed with an auxiliary application program for articulation disorder (hereinafter referred to as "auxiliary APP"), so as to perform the functions of communicating with the speech recognizing system 3 and transmitting and receiving data as described below.

When the speech input unit 41 receives a speech input from the user_k, the processing unit 42 receives the speech input from the speech input unit 41 and sends the speech input to the speech recognition model 31 via the Internet. After the acoustic model and the language model calculate the most likely character combination in connection with the speech input (that is, the result of speech recognition), the speech recognizing system 3 outputs the result of speech recognition and transmits the same to the assisting device 4.

The processing unit 42 receives the result of speech recognition and outputs the same through the output unit 43.

Figure 6:
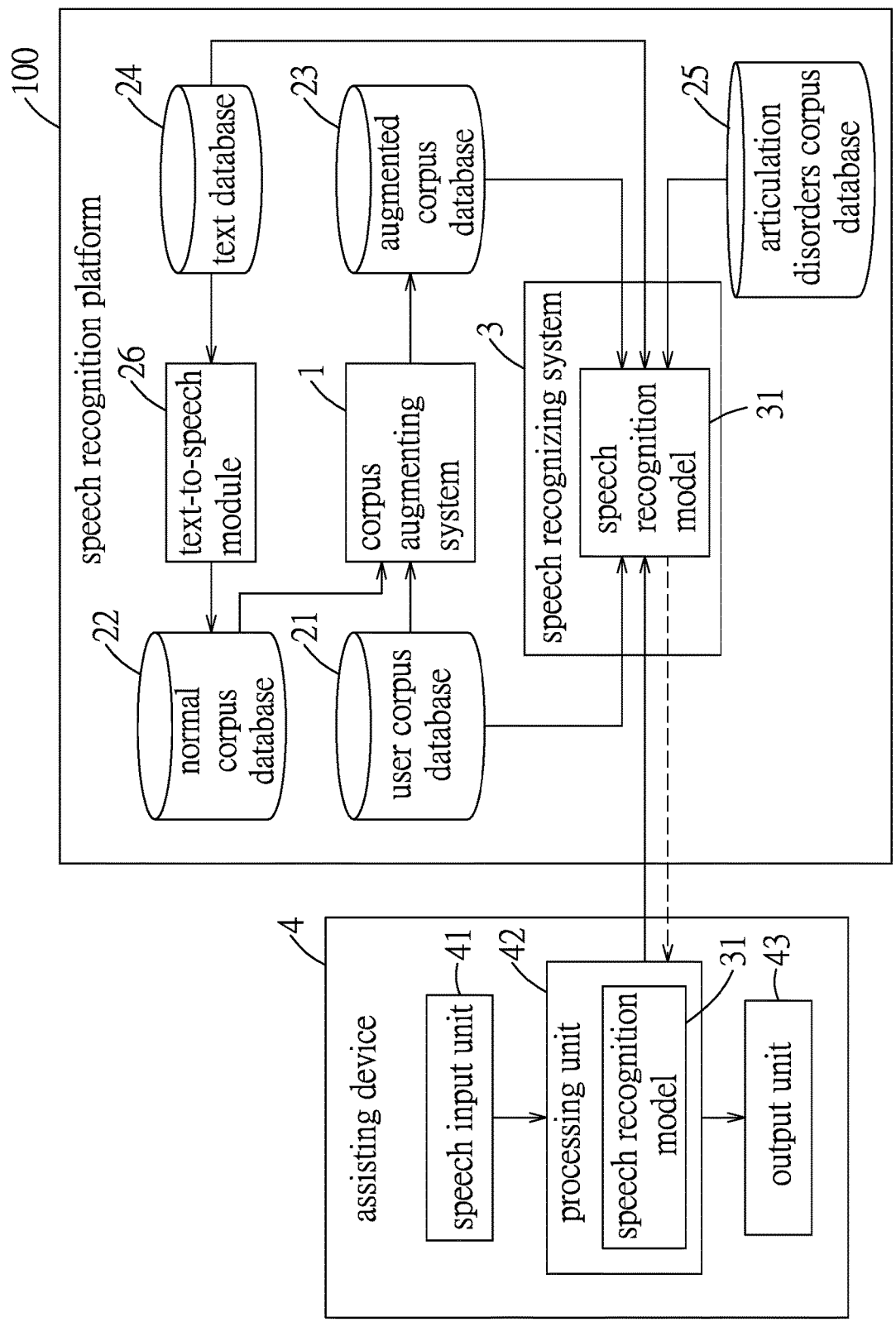
FIG. 6 is a block diagram illustrating a speech recognition platform according to another embodiment of the disclosure.

Referring to FIG. 6, in another embodiment, the speech recognition model 31 of the speech recognition system 3 can be downloaded to a user end device, e.g., the assisting device 4. Whenever the speech recognition model 31 is retrained, a user of the assisting device 4 may receive a notification about an available update on the speech recognition system 3. In this way, the assisting device 4 can use up-to-date speech recognition functions offline. Specifically, when the speech input unit 41 receives a speech input from the user_k, the acoustic model and the language model of the speech recognition model 31 calculate and obtain the result of speech recognition, and the output unit 43 outputs the result of speech recognition.

In another embodiment, the assisting device 4 may be an independent device dedicated to assisting a person with articulation disorder to communicate, and the user-specific speech recognition model 31 may be customized and installed in the assisting device 4 before the assisting device 4 is provided to the person with articulation disorder.

In summary, by repeating the method of forming an augmented corpus related to articulation disorder of the present disclosure, a huge number of augmented corpora can be obtained base on a small collection of the user's speech (target corpus). The speech recognition model 31 may be well trained via sufficient corpora, so as to provide speech recognition services for persons with articulation disorder.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, Figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of forming an augmented corpus related to articulation disorder, comprising:
receiving a target corpus recorded from a user with articulation disorder;
receiving a plurality of training corpora that are related to normal speech;
acquiring a set of target speech feature data from the target corpus;
acquiring a plurality of sets of training speech feature data respectively from the training corpora;
feeding the set of target speech feature data and the sets of training speech feature data into a conversion model for training the conversion model, so as to make the conversion model thus trained capable of converting each of the sets of training speech feature data into a respective set of output data that is similar to the set of target speech feature data;

receiving an augmenting source corpus that is related to normal speech;

acquiring a set of augmenting source speech feature data from the augmenting source corpus;

inputting the set of augmenting source speech feature data into the conversion model thus trained;

converting, by the conversion model thus trained, the set of augmenting source speech feature data into a set of converted speech feature data; and synthesizing the augmented corpus based on the set of converted speech feature data.

2. The method as claimed in claim 1, wherein:

the step of acquiring a set of target speech feature data from the target corpus includes acquiring, from the target corpus, at least one type of frequency domain parameter serving as the set of target speech feature data;

the step of acquiring a set of training speech feature data from each of the training corpora includes acquiring, from each of the training corpora, at least one type of frequency domain parameter serving as the set of training speech feature data; and the step of acquiring a set of augmenting source speech feature data from the augmenting source corpus includes acquiring, from the augmenting source corpus, at least one type of frequency domain parameter serving as the set of augmenting source speech feature data.

3. The method as claimed in claim 2, wherein the at least one type of frequency domain parameter acquired from each of the target corpus, the training corpora and the augmenting source corpus includes one of a spectral envelope, a set of Mel-frequency cepstral coefficients (MFCC), a raw waveform feature of time domain, a phonetic posteriorgram (PPG), an i-Vector and an x-Vector.

4. The method as claimed in claim 3, wherein the at least one type of frequency domain parameter acquired from each of the target corpus, the training corpora and the augmenting source corpus at least includes the spectral envelope and further includes a fundamental frequency;

wherein the step of converting the set of augmenting source speech feature data into a set of converted speech feature data includes converting the spectral envelope of the set of augmenting source speech feature data into a converted spectral envelope that serves as part of the set of converted speech feature data;

wherein the step of acquiring a set of augmenting source speech feature data from the augmenting source corpus further includes acquiring an aperiodic parameter from the augmenting source corpus;

wherein the step of synthesizing an augmented corpus includes:

transforming, through a preset linear mapping function, the fundamental frequency of the augmenting source corpus into a transformed fundamental frequency that is similar to the fundamental frequency of the target corpus; and utilizing the transformed fundamental frequency, the converted spectral envelope, and the aperiodic parameter of the augmenting source corpus to synthesize the augmented corpus.

5. The method as claimed in claim 1, wherein the augmenting source corpus and the training corpora are obtained by at least one of recording speech of a human being, or storing audio output of a text-to-speech module.

6. The method as claimed in claim 1, wherein the step of synthesizing the augmented corpus is implemented further based on the set of augmenting source speech feature data.

7. A corpus augmenting system, comprising:

a conversion model;

a feature acquiring module configured to receive a target corpus recorded from a user with articulation disorder and acquire a set of target speech feature data therefrom, receive a plurality of training corpora that are related to normal speech, and acquire a plurality of sets of training speech feature data respectively from the training corpora, receive an augmenting source corpus that is related to normal speech and acquire a set of augmenting source speech feature data from the augmenting source corpus, feed the set of target speech feature data and the sets of training speech feature data into said conversion model for training said conversion model, so as to make said conversion model thus trained capable of converting each of the sets of training speech feature data into a respective set of output data that is similar to the set of target speech feature data, and input the set of augmenting source speech feature data into said conversion model thus trained, said conversion model thus trained being configured to convert the set of augmenting source speech feature data into a set of converted speech feature data; and a waveform reconstruction module configured to synthesize the augmented corpus based on the set of converted speech feature data.

8. The corpus augmenting system as claimed in claim 7, wherein said feature acquiring module acquires from the target corpus at least one type of frequency domain parameter serving as the set of target speech feature data, acquires from each of the training corpora at least one type of frequency domain parameter serving as the set of training speech feature data that corresponds to the training corpus, and acquires from the augmenting source corpus at least one type of frequency domain parameter serving as the set of augmenting source speech feature data.

9. The corpus augmenting system as claimed in claim 8, wherein the at least one type of frequency domain parameter acquired from each of the target corpus, the training corpora and the augmenting source corpus includes one of a spectral envelope, a set of Mel-frequency cepstral coefficients (MFCC), a raw waveform feature of time domain, a phonetic posteriorgram (PPG), an i-Vector and an x-Vector.

10. The corpus augmenting system as claimed in claim 9, wherein:

said feature acquiring module acquires the at least one type of frequency domain parameter by acquiring a spectral envelope, and further acquires a fundamental frequency and an aperiodic parameter;

said conversion model converts the spectral envelope of the set of augmenting source speech feature data into a converted spectral envelope that serves as part of the set of converted speech feature data; and said waveform reconstruction module transforms, through a preset linear mapping function, the fundamental frequency of the augmenting source corpus into a transformed fundamental frequency that is similar to the fundamental frequency of the target corpus, and utilizes the transformed fundamental frequency, the converted spectral envelope, and the aperiodic parameter of the augmenting source corpus to synthesize the augmented corpus.

11. The corpus augmenting system as claimed in claim 7, wherein said waveform reconstruction module is configured to synthesize the augmented corpus further based on the set of augmenting source speech feature data.

12. A speech recognition platform, comprising:
a corpus augmenting system as claimed in claim 7;
a user corpus database storing the target corpus recorded from the user with articulation disorder;
an augmented corpus database storing the augmented corpus formed by said corpus augmenting system; and
an automatic speech recognition (ASR) system having a deep learning model, and configured to receive the target corpus and the augmented corpus respectively from said user corpus database and said augmented corpus database, and to train said deep learning model with the target corpus and the augmented corpus, said deep learning model thus trained serving as a user-specific speech recognition model specific to the user.

13. The platform as claimed in claim 12, further comprising:
a normal corpus database storing normal corpora of a plurality of normal speakers, the normal corpora being used to form the plurality of training corpora and the augmenting source corpus;
a text database storing a plurality of pieces of text; and
a text-to-speech module configured to read one of the pieces of text in said text database and generate a speech file which is stored in said normal corpora database as one of the normal corpora.

14. The platform as claimed in claim 13, wherein said automatic speech recognition (ASR) system is further configured to receive the plurality of pieces of text stored in said text database, and to use the plurality of pieces of text to train said user-specific speech recognition model.

15. An assisting device, comprising:
a speech input unit configured to receive a user speech input;
a processing unit connected to said speech input unit, and configured to receive the user speech input from said speech input unit and to send the user speech input to a user-specific speech recognition model for speech recognition, the user-specific speech recognition model being trained with a target corpus recorded from a user with articulation disorder and the augmented corpus that is formed by the method as claimed in claim 1, and configured to recognize the user speech input and returning a recognition result; and
an output unit connected to said processing unit, and configured to receive and output the recognition result.

* * * * *